United States Patent Office 3,070,891
Patented Jan. 1, 1963

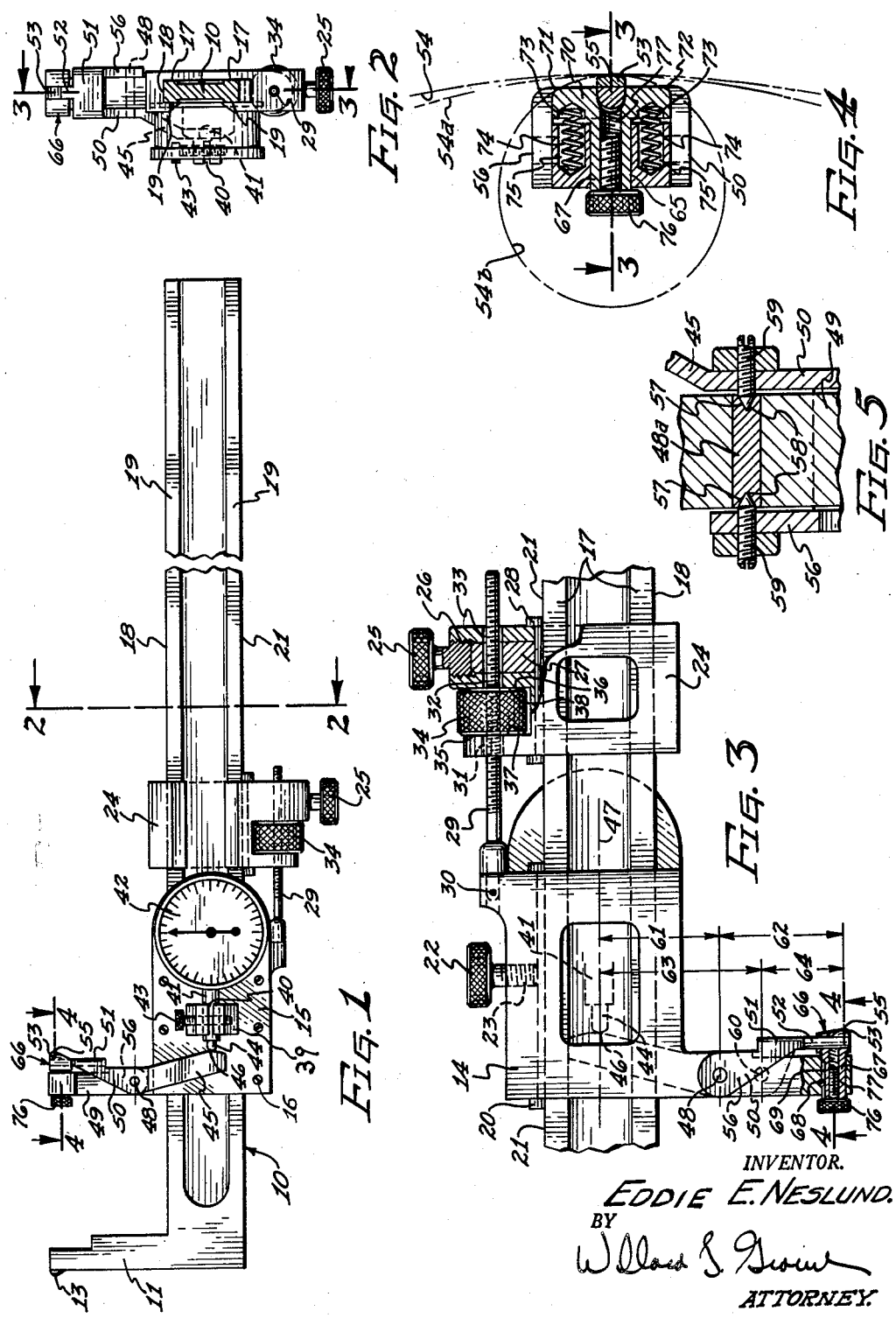

3,070,891
DIAL INDICATOR CALIPER GAGE
Eddie E. Neslund, 1241 S. 27th St., Phoenix, Ariz.
Filed Feb. 4, 1960, Ser. No. 6,732
1 Claim. (Cl. 33—178)

This invention pertains to improvements in dial indicator caliper gages.

One of the objects of this invention is to provide a dial indicator caliper gage which is fast and easy to adjust to any sized hole within the range of the particular sized gage used.

Another object of this invention is to provide a dial indicator caliper gage wherein the various dial indicators are readily interchangeable to obtain any desired accuracy of indication required.

A further object of this invention is to provide a dial indicator caliper gage with an arm that contacts the work and an indicator point that has radii such that when the arm moves to probe the distance of two points of size variation, there is obtained a direct reading of the size difference.

It is also another object to provide in connection with the aforementioned gage an arrangement wherein the two contact points that contact the work to be measured are always moved in a straight line keeping the two contact points and a centering plunger in straight alignment with the center of the hole being measured.

The device herein contemplated includes two contact points that measure the hole size and which are so constituted as to measure very shallow holes and ledges.

Another object is to provide in the gage device a centering plunger that can be adjusted by an adjusting screw in the plunger to contact different size radii and ledges to limit travel for easier entrance of the gage in the hole to be measured.

Also it is an object to have the pivot bearing located in an intermediate position of the length of the arm between the point that contacts the work and stem of the dial indicator, which pivot bearing may be variously positioned to change the degree of sensitivity required and to accommodate the gage to various types of dial indicators.

Further, it will be noted that an object is to provide two contact points that can be set to a predetermined size by gage blocks, ring gage or micrometers or duplicating hole size or distance between two parallel objects; the device being also usable to take a reading of a hole or two parallel objects and then check the two contact points by a ring gage, gage blocks or micrometer.

And still another object of this invention is to provide a gage as aforementioned that can be used on any machine to measure hole size or distance between two parallel objects to the correct size without taking the part off the machine or moving the cutting tool off location relative to the work in order to take a reading or measurement of the part being machined.

Further features and advantages of this invention will appear from a detailed description of the drawings in which:

FIG. 1 is a side elevation of a dial indicator caliper gage incorporating the features of this invention;

FIG. 2 is an end view of the gage partly in section as indicated by the line 2—2 of FIG. 1;

FIG. 3 is an enlarged fragmentary view of the opposite side of the gage shown in FIG. 1, partly in section on the line 3—3 of FIGS. 2 and 4;

FIG. 4 is an enlarged sectional view on the line 4—4 of FIGS. 1 and 3;

FIG. 5 is an enlarged fragmentary sectional view showing an alternate method of pivotally mounting the sensing lever.

As an example of one embodiment of this invention, there is shown a dial indicator caliper gage incorporating the features of this invention comprising a frame 10 having the integral anvil arm 11 on the outer end of which is fixed the work contacting anvil 13. The setting carriage 14 has a cover plate 15 fixed thereto by suitable screws 16. The carriage is slidably mounted on the surfaces 17, 18 and 19 of the main frame and a clamping gib 20 engages the surface 21 of the frame 10 with a clamping screw 22 threaded in the carriage 14 at 23 engaging the gib 20 so as to clamp the carriage in one desired longitudinally adjusted position on the frame 10.

Preferably a vernier positioning device is utilized for the setting carriage comprising a vernier carriage 24 slidably mounted on the surfaces 17, 18, 19 and 21 of the frame 10 and clampable thereto at adjusted positions by a clamp screw 25 threadedly mounted at 26 in the frame 24 and engaging a plunger 27 which in turn engages the clamping gib 28 to clamp it against the surface 21 of the frame 10 to secure the vernier frame thereon. A positioning screw 29 is fixed at 30 to the setting frame 14 and extends through clearance bores 31, 32 and 33 in the vernier frame 24 and has threadedly mounted thereon the adjusting nut 34 having side faces 35 and 36 abuttingly engaging the surfaces 37 and 38 of the vernier carriage 24 so that when the vernier carriage 24 is locked to the frame 10 by tightening the clamp screw 25 and with clamp screw 22 released, rotating of nut 34 in desired direction precisely positions the setting carriage 14 on the frame 10.

A dial gage clamping bracket 39 is rigidly secured to cover plate 15 of the setting carriage 14 and has a split bore 40 adapted to receive the mounting barrel 41 of a dial indicator 42, a suitable clamp screw 43 being provided on the clamping bracket 39 to secure the gage barrel in the split bore 40. The dial indicator 42 has the usual actuating stem 44 which contacts the outer end of the arm 45 at the point 46 located on the line 47. The arm 45 is journaled on the pin 48 which is fixed in the extension portion 49 of the setting frame 14. The arm 45 extends forwardly at 50 of the pin 48 and is joined integrally to a bridge piece 51 from which outwardly extends the integral sensing anvil arm 52 having the work contacting sensing anvil 53 which is adapted to engage the work surface 54, 54a or 54b at the point 55. For greater stability the bridge piece 51 is also connected integrally to the arm 56 journaled on the other end of the pin 48 from the arm 45. It is to be understood that the arm 56 could have a rearwardly extension such as the arm 45 and that a dial gage supporting bracket similar to the bracket 39 be provided on the setting carriage 14 so that dial gages may be used on either or both sides of the caliper for easier reading and handling when taking measurements in difficult locations.

In FIG. 5 is shown an alternate method of pivotally mounting the sensing lever 45—50—56 in which pin 48 is modified as shown at 48a having conical sockets 57 in the ends thereof which receive the mating conical pointed ends 58 of the trunnion screws 59 carried in the arms 45 and 56. By this arrangement both radial and thrust play may be closely regulated for maximum accuracy in the sensing anvil 53.

In order to accommodate different types of dial indicators 42 having various calibrations and to change the sensitivity of the device, one or more additional mounting holes 60 may be provided for pins 48 or 48a in the extension portion 49. In the full line showing in the drawings, a one-to-one ratio is provided for the arm 45 so that distance 61 equals distance 62. In the broken line showing of hole 60 distance 63 is twice distance 64 for a two-to-one ratio for the arm 45 to double the sensitivity of the device. Any other ratios may be selected by appropriately providing various position for the hole 60 and pins 48 and 48a on the extension arm 49.

Formed in the outer end of the extension portion 49 is a bore 65 in which is vertically slidable the T-shaped centering adaptor 66 having the stem 67 mounted by a slip fit in said bore. A pin 68 fixed in the extension portion 49 slidingly engages the flatted surface 69 of the stem 67 to prevent rotation of the stem in the bore 65 while allowing unrestricted axial movement of the stem therein. The cross bar portion 70 of the centering adaptor 66 has convex work contacting surfaces 71 and 72 and below these areas are cavities 73 which receive the ends of the compression springs 74 which in turn are carried in bores 75 formed in the extension portion 49 so as to yieldingly urge the surfaces 71 and 72 into contact with the work surface 54b. An adaptor screw 76 is threaded into the threaded bore 77 and is utilized to secure the centering adaptor 66 in the extension portion 49 and to limit the outward travel of the centering adaptor toward the work. When larger diameter bores are to be measured than that shown at 54b, such as bores 54 and 54a, a centering adaptor with a wider cross bar portion may be substituted by simply removing the adaptor screw 76 and inserting the wide cross bar adaptor and replacing the screw 76, the wide bar having suitable convex work contacting surfaces similar to surfaces 71 and 72 engaging bores 54 or 54a.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A sensitive dial indicator caliper gage comprising in combination:
 a. a frame having,
 b. an integral laterally extending anvil arm,
 c. a work contacting anvil fixed on the outer end of said laterally extending anvil arm having,
 d. a work contacting surface facing in the direction of longitudinal extent of said frame,
 e. a setting carriage slidable longitudinally on said frame,
 f. a clamping gib on said setting carriage to engage said frame for clamping said carriage to said frame,
 g. a dial gage clamping bracket rigidly secured to the side of said carriage having a split bore having its axis extending longitudinally of said frame,
 h. a dial indicator having,
 i. a mounting barrel gripped in said bore in said clamping bracket,
 j. an actuating stem on said dial indicator,
 k. an arm pivoted intermediate its ends on said carriage,
 l. an abutment surface on one end of said pivoted arm adapted to engage the outer end of said actuating stem of said dial indicator,
 m. a work sensing abutment surface on the other end of said pivoted arm facing longitudinally of said frame in a direction opposite from the work contacting surface on said anvil arm and in longitudinal alignment with said work contacting anvil on said laterally extending anvil arm,
 n. a T-shaped centering adaptor having,
 o. a stem, limited to axially slidable movement on said carriage longitudinally of said frame, having its axis located parallel to and between a line passing through said work contacting surface on said anvil arm and sensing abutment surface on said pivoted arm and said frame,
 p. a cross bar portion formed integral with said stem having,
 q. convex work contacting surfaces each side of said sensing abutment positioned in a plane containing said line located parallel to the longitudinal extent of said frame and lying on the opposite side of the axis of said stem from said frame,
 r. and compression springs in said carriage adapted to directly engage the outer ends of said T-shaped centering adaptor each side of said sensing abutment and behind said convex work contacting surfaces so as to freely yieldingly urge said T-shaped centering adaptor outwardly away from said contacting anvil on said anvil arm.

References Cited in the file of this patent

UNITED STATES PATENTS

| | | |
|---|---|---|
| 454,516 | Brown | June 23, 1891 |
| 477,104 | Darling | June 14, 1892 |
| 1,611,441 | Higgins | Dec. 21, 1926 |
| 2,274,275 | Phillips | Feb. 24, 1942 |
| 2,661,539 | Lovenston | Dec. 8, 1953 |

FOREIGN PATENTS

| | | |
|---|---|---|
| 640,217 | France | Mar. 24, 1928 |
| 646,248 | Great Britain | Nov. 15, 1950 |